United States Patent [19]
DeRosa et al.

[11] Patent Number: 5,209,795
[45] Date of Patent: May 11, 1993

[54] METHOD OF FORMING A SEAL REMOVAL TAB ON A COLLAPSIBLE TUBE

[75] Inventors: Richard F. DeRosa, Newtown Square; Carl B. Schartner, Wallingford, both of Pa.

[73] Assignee: Teledyne Industries, Inc., Chester, Pa.

[21] Appl. No.: 743,472

[22] Filed: Aug. 9, 1991

[51] Int. Cl.⁵ ............................................. B65B 7/00
[52] U.S. Cl. ................................. 156/69; 156/475; 156/483; 215/232; 215/305; 220/359; 53/133.3; 53/329.3
[58] Field of Search ............... 156/69, 475, 483; 215/232, 298, 303, 305; 220/258, 359; 53/478, 133.3, 329.2, 329.3, 420

[56] References Cited

U.S. PATENT DOCUMENTS

| | | | |
|---|---|---|---|
| 1,654,720 | 1/1928 | Clark . | |
| 1,848,695 | 3/1932 | Church | 53/133.3 X |
| 2,066,708 | 1/1937 | Young | 215/43 |
| 2,099,097 | 11/1937 | Beider et al. | 215/7 |
| 2,120,491 | 6/1938 | Flower | 221/60 |
| 2,133,490 | 10/1938 | Swannell | 215/7 |
| 2,134,178 | 10/1938 | Esposito | 215/7 |
| 2,322,885 | 6/1943 | Rogers | 113/80 |
| 2,750,068 | 6/1956 | Platt | 220/27 |
| 2,864,521 | 12/1958 | Kundert | 215/42 |
| 3,067,653 | 12/1962 | Lesser et al. | 53/329.3 X |
| 3,102,182 | 8/1963 | Oelze et al. | 219/19 |
| 3,199,702 | 8/1965 | Fischbach | 215/42 |
| 3,231,444 | 1/1966 | Shick | 156/282 |
| 3,235,128 | 2/1966 | Hansen | 222/107 |
| 3,239,397 | 3/1966 | Hoyle | 156/69 |
| 3,361,304 | 1/1968 | Thompson | 222/189 |
| 3,504,818 | 4/1970 | Crisci et al. | 215/42 |
| 3,650,428 | 3/1972 | Miller | 215/42 |
| 3,731,849 | 5/1973 | Burrows | 222/153 |
| 3,747,751 | 7/1973 | Miller et al. | 206/65 |
| 3,773,205 | 11/1973 | Keeler et al. | 215/42 |
| 3,800,502 | 4/1974 | Vermeulen | 53/329.2 |
| 3,812,994 | 5/1974 | Feldman | 215/256 |
| 3,850,776 | 11/1974 | Karobath et al. | 156/475 |
| 3,900,123 | 8/1975 | Darlington | 215/216 |
| 3,900,125 | 8/1975 | Wyler et al. | 215/341 |
| 3,909,326 | 9/1975 | Renck | 156/69 |
| 3,928,109 | 12/1975 | Pollock et al. | 156/272 |
| 3,980,195 | 9/1976 | Fillmore | 215/256 |
| 3,988,185 | 10/1976 | Johnson et al. | 156/69 |
| 4,094,460 | 6/1978 | Scanga et al. | 229/43 |
| 4,171,084 | 10/1979 | Smith | 229/43 |
| 4,394,917 | 7/1983 | Looser | 53/478 X |
| 4,442,129 | 4/1984 | Niwa et al. | 426/399 |
| 4,534,480 | 8/1985 | Santostasi et al. | 215/252 |
| 4,595,434 | 6/1986 | Eckstein et al. | 156/69 |
| 4,605,136 | 8/1986 | Debetencourt | 215/232 |
| 4,660,732 | 4/1987 | Moore | 215/232 |
| 4,681,645 | 7/1987 | Fukushima et al. | 156/73.1 |
| 4,750,642 | 6/1988 | Eckstein et al. | 222/81 |
| 4,771,903 | 9/1988 | Levene et al. | 215/232 |
| 4,872,571 | 10/1989 | Crecelius et al. | 215/232 |
| 4,892,209 | 1/1990 | Dorfman et al. | 215/308 X |
| 4,938,818 | 7/1990 | Dzedzej et al. | 156/69 |
| 5,119,964 | 6/1992 | Witt | 215/232 X |

FOREIGN PATENT DOCUMENTS 485344 10/1927 Fed. Rep. of Germany ..... 53/133.3

OTHER PUBLICATIONS

Teledyne Report, Second Quarter, 1985, Teledyne, Inc.
Ltr. from 3M Packaging Systems Division to Tele--Dyne Wirz Corporation, dated Apr. 6, 1988.

*Primary Examiner*—David A. Simmons
*Assistant Examiner*—Mark A. Osele
*Attorney, Agent, or Firm*—Eugene Chovanes

[57] ABSTRACT

The present invention is for a method of forming means to remove a seal that has been affixed to a collapsible tube in accordance with the method shown in U.S. Pat. No. 4,938,818. A laminate removal tab is cut integral with the seal when the seal is cut, and then bent out of the way along the tube neck when the seal is welded to the tube mouth. The seal is easily lifted and grasped by the fingers to pull the seal off the mouth.

1 Claim, 3 Drawing Sheets

METHOD OF FORMING A SEAL REMOVAL TAB ON A COLLAPSIBLE TUBE

BACKGROUND OF THE INVENTION

1. Field of the Invention

This invention relates generally to collapsible tubes used to contain and dispense fluids, and particularly to tubes having a seal of laminated material on the dispensing orifice of a prior art tube formed of a collapsible tube wall of laminate material welded to a plastic head portion.

Collapsible tubes are packages in tube form having a dispensing orifice at one end of a deformable tube. The tube is deformed and collapsed by squeezing so that the contents are forced out the orifice. Such tubes are used to contain toothpaste, pharmaceuticals, cosmetics, personal care products, artists' pigments, adhesives, sealants and caulking materials, greases and lubricants, foods and condiments, and many other products. Collapsible tubes generally have a screw cap closure.

2. Description of Related Art a. Prior Art Collapsible Tubes

Collapsible tubes are formed of (1) metal alone or (2) plastic alone, or (3) a combination of a rigid plastic head portion and a deformable laminate tube body portion.

b. Method of Making Prior Art Collapsible Tubes

Metal tubes are formed by impact extrusion from metal slugs in a die cavity wherein a ram forces the metal into the tube shape.

Plastic tubes of, for instance, polyethylene, are injection molded into the desired tube shapes.

Laminate tubes consist of at least two parts; namely, (1) a rigid pure plastic head portion and (2) a tube body formed of a laminate of layers of plastic and metal foil, adhesively held together. The tube body is joined, in a separate step, to the molded plastic head by, for instance, radio frequency welding.

The tubes are filled through an open bottom. The tubes are then closed at the bottom, generally by a fold.

c. Prior Art Seals on Collapsible Tubes

Prior art collapsible tubes, particularly those formed of metal, often have a seal across the dispensing orifice of the tube. Seals are generally used when the tube contains medicinal products. The seal is pierced and deformed before the contents are discharged. An unbroken seal assures the user that the product has not been tampered with or otherwise contaminated. In use, the seal is pierced by, for instance, a point formed in the tube screw cap. It is highly desirable that the seal, once broken by the user, remains in a fixed, open position so that the contents can be easily squeezed from the tube.

Metal foil seals work extremely well, since they stay deformed, once pierced. Pure plastic seals are far less desirable since they spring back after being perforated and block the flow from the tube. Also, plastic tubes, in which plastic seals are easily formed, spring back after being squeezed and suck air back into the tube. The plastic tube does not stay deformed to shrink with the contents as does a metal tube.

Laminate tubes having rigid plastic heads welded to collapsible tube walls formed of a laminate of metal and plastic deform relatively well. Forming a seal of other than pure plastic, which is unsatisfactory on such tubes, however, is a problem. The tube dispensing orifice is in a head formed of a pure plastic, whereas the deformable tube body is made of a laminate which must be welded to the head portion having the dispensing orifice therein, in a separate step, to assemble the tube components.

d. Method of Forming Prior Art Seals

Prior art seals have been formed in different ways, depending upon the material from which the tube is made.

In a metal collapsible tube, a metal foil seal can be readily formed integral with the neck, across the mouth of the tube, by simply suitably designing the die cavity. The ram, in extruding the tube within the cavity, forms the integral metal seal. The seal is punctured prior to use and stays in its punctured position.

A seal can also be formed integral with the tube of pure plastic during the molding operation, wherein the entire tube is formed at one time. Plastic tubes lack the ability to shrink with the contents as the tube is used, since the springy plastic material holds its shape and sucks air into the package when hand pressure is removed. The plastic seal likewise is springy and does not retain its punctured condition, but rather springs back to block easy dispension of the contents.

Collapsible tubes called laminate tubes are formed of a laminate wall welded to a plastic head. The walls of such a tube do not spring back as do the pure plastic tubes. In contrast to metal tubes and pure plastic tubes which are formed in one piece in an extrusion or molding, laminate tubes are formed of individual parts assembled together. A head portion is injection molded of pure thermoplastic. A tube body of laminate is separately formed. The parts are then welded together. Since the head portions of the laminate tubes are of pure plastic and are molded, it is possible to mold a pure plastic seal in the mouth of the tube. As explained above, such pure plastic seal is unacceptable since, after piercing, it does not stay out of the way of discharge of the contents, but springs back to continue to form an obstacle across the mouth.

It is therefore necessary, in a laminate tube, to form a seal of a deformable material, such as a laminate, which can be welded to the laminate tube dispensing orifice in the head, which is formed of rigid plastic.

Problems arise in securing a seal of laminate to the dispensing orifice of the plastic head of a laminate tube in that the seal must be formed, positioned and held and then welded to the head as by heat sealing or radio frequency welding. In the prior art, as disclosed in U.S. Pat. No. 4,595,434, a seal of laminate material is secured to the dispensing orifice of a laminate tube after the laminate tube has been welded to the rigid plastic head portion. The seal of laminate is cut to the finished dimensions and placed within a screw cap closure of rigid plastic. The cap is then screwed on the neck of the tube over the dispensing orifice to hold the seal in position for welding by radio frequency. A ferrite mandrel is used within the tube to prevent damage to the weld between the wall and the head.

A problem with such method is that the seal cannot be visually inspected after completion without unscrewing the cap. A further problem is that the sealing operation takes place after the wall has been assembled to the head, so that extreme care must be taken that the shoulder weld between the rigid plastic head portion and the laminate wall portion is not damaged by the radio waves used to apply the seal. Additionally, it is cumbersome to cut and place a laminate seal in the head of a cap.

Considering that tubes are made on a mass basis with repetitive machine operations, these problems in the prior art represent a burden during the manufacturing process.

e. The U.S. Pat. No. 4,938,818

Prior art laminate tubes are formed of an injection molded solid thermoplastic head portion having an integral shoulder and neck, with a dispensing orifice therein, welded to a tube formed of a laminated wall. The wall has layers of metal foil, thermoplastic, and sometimes paper.

In the invention disclosed in U.S. Pat. No. 4,938,818, incorporated by reference herein, a seal of laminate material is cut, positioned on the head dispensing orifice and held thereto, and then heat-sealed by a hot press to the orifice before the head is welded to the laminate tube wall. When the tube wall is subsequently assembled and welded by radio frequency to the head, a special heat sink is positioned adjacent the seal to avoid damage to the seal.

The laminate material from which the seal is made is in web form and positioned across the head dispensing orifice. A seal is die cut from the web right over the orifice, whereupon it is held securely thereto by a vacuum applied through the bottom of the head through the orifice. A heat press is applied to the seal over the orifice and the thermoplastic layer in the seal laminate, which is adjacent to the thermoplastic lip of the dispensing orifice, melts the thermoplastic at the contact interface, after which the press is removed. The weld then cools, hardens, and fuses the seal to the outlet.

The head is then assembled with the tube wall, which has been preformed in prior art fashion. In forming the tube wall, a continuous web of material is formed into a continuous tube and then welded as by radio frequency along the longitudinal seam. The continuous tube so formed is then cut into lengths corresponding to the collapsible tube lengths.

The tube lengths are then assembled individually on a mandrel and brought into position adjacent the tube heads and welded thereto by radio frequency.

A special heat sink is placed adjacent the seal to absorb heat generated by the weld operation, so there is no heat buildup in the laminate seal, which contains a metal foil layer.

The seal of laminate material is pierced to gain access to the tube contents, as shown for instance by a cap having a point, as shown in FIG. 10 of the '818 patent.

SUMMARY OF THE PRESENT INVENTION

In the present invention, means are provided to remove, rather than pierce, the seal formed by the method disclosed in U.S. Pat. No. 4,938,818 referred to above. The seal is provided with an integral tab. The tab is positioned on the neck of the tube perpendicular, or normal, to the plane of the seal across the tube opening, and hugs the neck without adhering thereto. The tab is easily lifted from the neck and pulled to peel the seal from its weld to the neck. The weld is a relatively strong one so that the strength of the laminate is far greater than that of a pure thin metal foil, and is utilized to transmit the necessary force to separate the band, or weld, between the seal and the orifice formed by the heat press when the seal was applied.

The tab is formed integrally when the seal is cut as disclosed in the '818 patent, and bent and positioned along the neck when the seal is welded to the plastic head, again the manner taught in the '818 patent.

DESCRIPTION OF THE PREFERRED EMBODIMENT (a) Prior Art Laminate Tube

Figure 2:
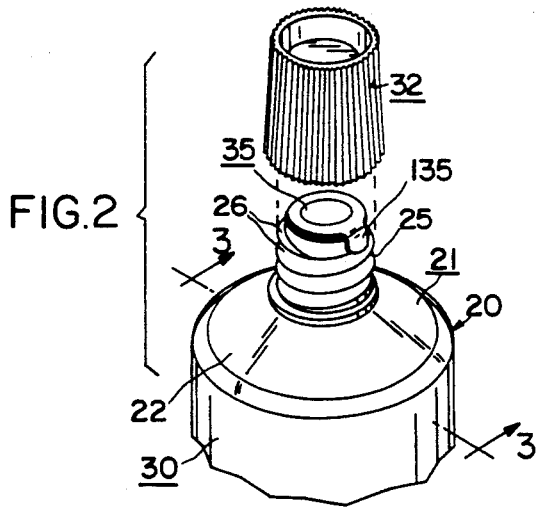
FIG. 2 is an exploded fragmentary isometric view of the dispensing orifice of a laminate tube sealed by means of a seal with a tab applied by the method of the invention, the screw cap being removed from the neck of the tube.
Figure 3:
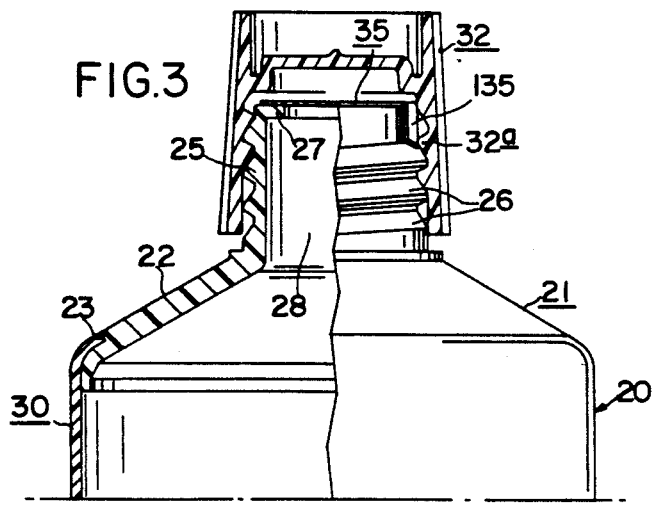
FIG. 3 is an enlarged fragmentary sectional view taken on the line 3,3 of FIG. 2, illustrating details of a tube made in accordance with the invention.
Figure 5:
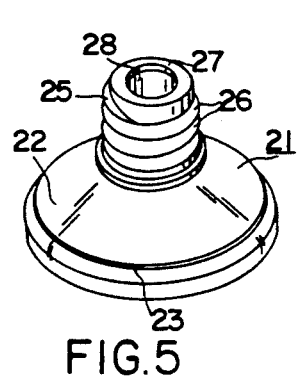
FIG. 5 is a perspective view of an injection molded head prior to being sealed.

As seen particularly in FIGS. 2 and 3, a laminate tube 20 has a rigid molded thermoplastic head 21 having a downwardly, outwardly sloping shoulder 22. Shoulder 22 has at its outer circumference a recessed ridge 23, as seen for instance in FIG. 3. The head 21 is generally in the form of a concave disk and has at its center a neck 25 having integral screw thread 26 thereon. The neck 25 terminates at lip 27.

A dispensing orifice 28 extends through the neck 25. Head 21 is mass-produced by injection molding, in one piece, in a well known prior art manner from a suitable thermoplastic such as polyethylene.

Head 21 is welded to tube wall 30 which is composed of a laminate. A typical laminate can be for instance 310 microns in thickness and can have a central metal foil of aluminum 40 microns thick, adjacent layers of special polyolefine, the inner adjacent layer of a 40 micron thickness and the outer adjacent layer being white pigmented and of a 70 micron thickness, an inner layer of medium density transparent polyolefine film and an outer layer of transparent polyolefine film 90 microns in thickness. The four layers are all suitably bonded together to form the laminate from which the tube wall 30 is formed. Such laminate material which is shown in the '818 patent is well known in the prior art, and is sold by various manufacturers to firms that make collapsible laminate tubes. Also specific examples are set forth in detail in U.S. Pat. No. 4,595,434.

The tube wall 30 is formed by taking an endless web of laminate and suitably curving the web into an endless cylinder that passes through a welding station which welds the longitudinal seam, as by radio frequency. The endless tube is then continuously chopped into lengths corresponding to the continuous tube wall.

A screw cap 32 is threaded onto threads 26 on neck 25.

(b) Prior Art Method of Forming a Laminate Seal Disclosed in U.S. Pat. No. 4,938,818

Figure 1:
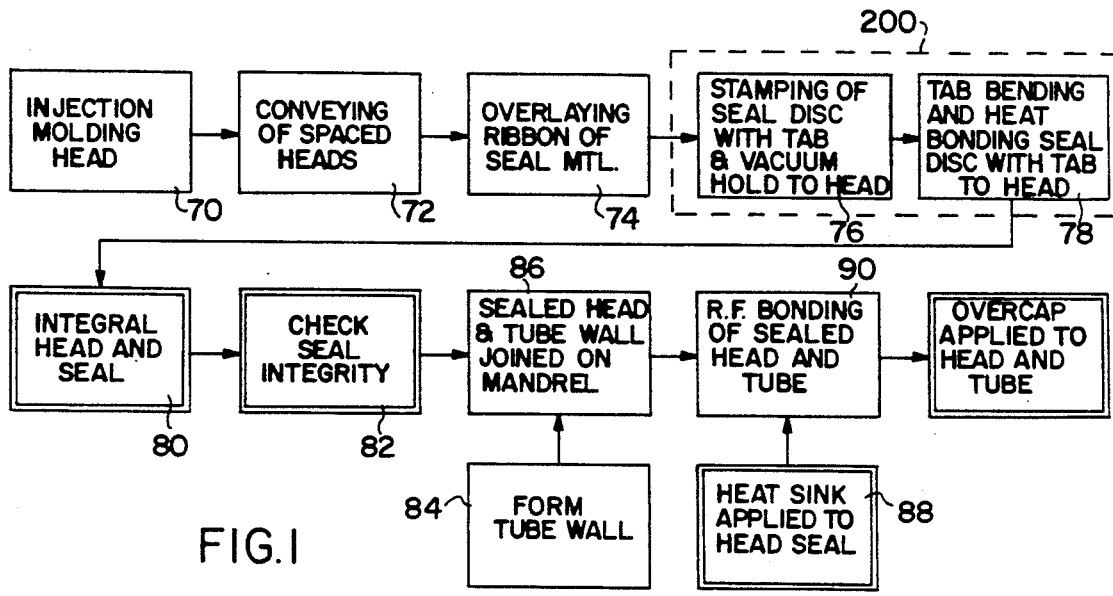
FIG. 1 is a block diagram showing steps in a method forming a collapsible tube, with the new steps relating to the present invention enclosed in a dashed box.
Figure 4A:
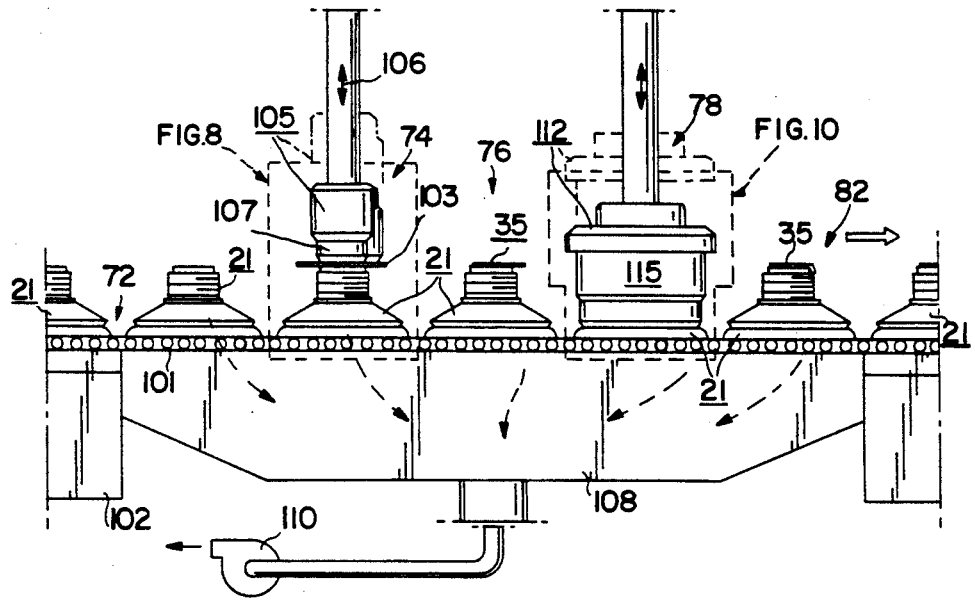
FIG. 4A is a fragmentary side elevational view of an assembly line wherein the seal with a tab is applied to the head portion of the tube.
Figure 4B:
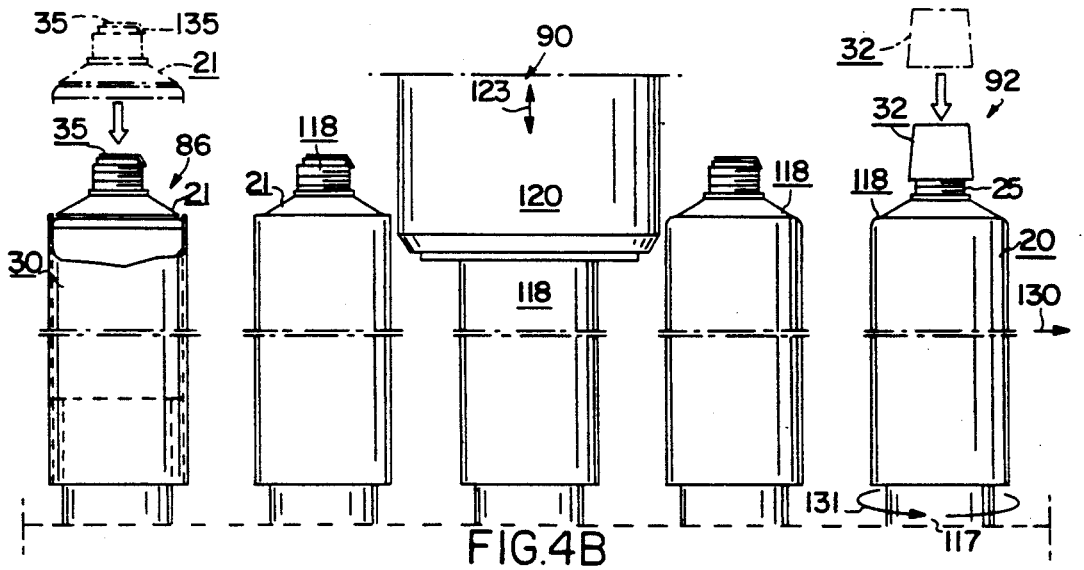
FIG. 4B is a schematic side elevational view of the various successive steps in the assembly of the tube.
Figure 8:
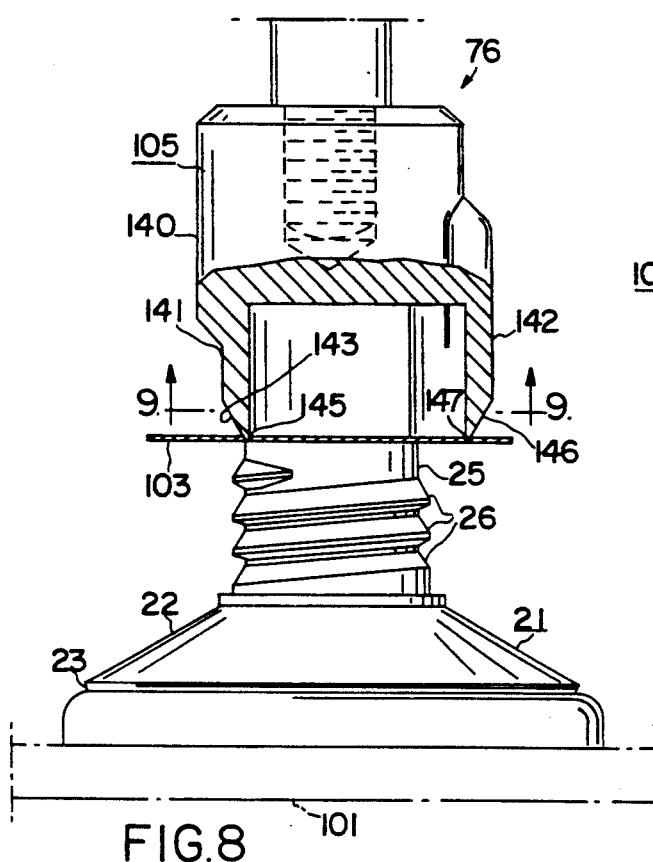
FIG. 8 is an enlarged fragmentary elevational view of the detail contained within the dashed box of FIG. 4A and designated FIG. 8, showing details of the die, web, and injection molded head at the die-cut seal with a tab overlay station.
Figure 9:
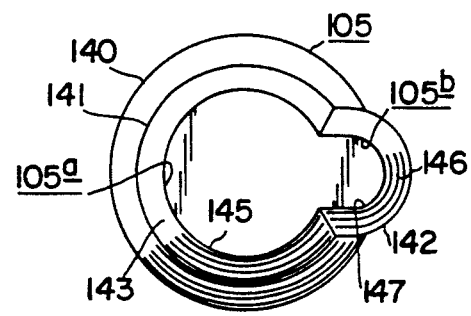
FIG. 9 is a bottom plan view of the seal with a tab die-cutting head, taken on the line 9,9 of FIG. 8.
Figure 10:
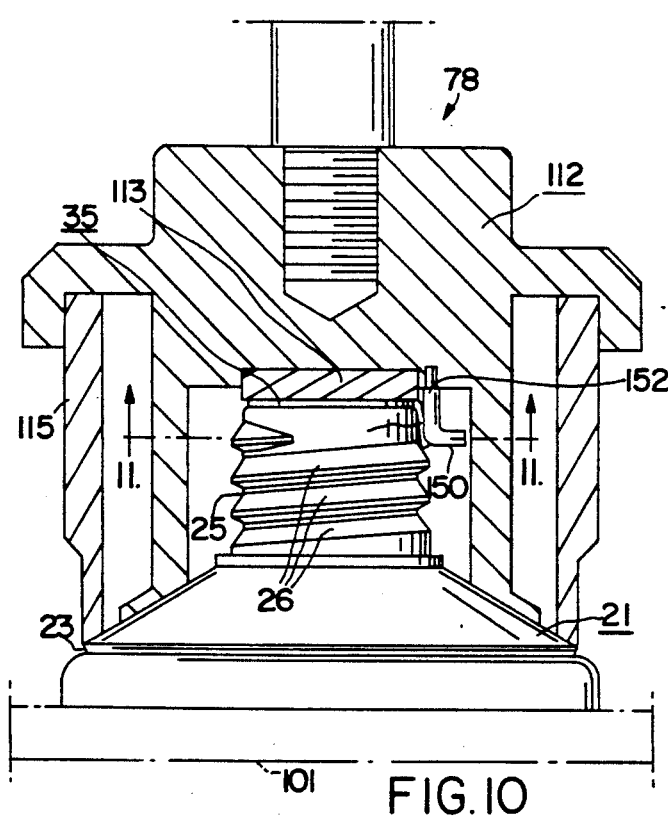
FIG. 10 is an enlarged fragmentary elevational view of the detail contained within the dashed box of FIG. 4A and designated FIG. 10, with portions in section to show details of the tab bending and heat bonding of the seal disk with a tab to the injection molded head.
Figure 11:
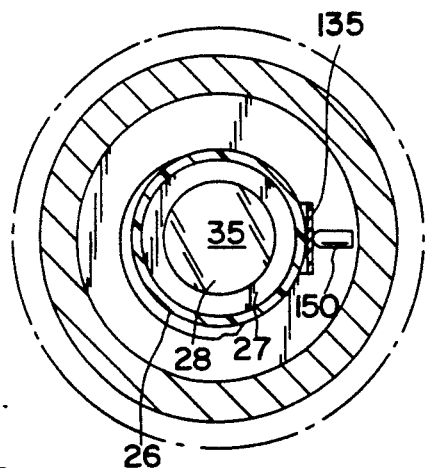
FIG. 11 is a sectional view taken on the line 11,11 of FIG. 10, showing additional details of the tab bending means.

Thermoplastic heads 21 are injection molded at station 70 in FIG. 1, and moved continuously in a file, neck up, at station 72 as seen in block diagram of FIG. 1, and the schematic diagram of FIG. 4A. A driven track 101 supported on base 102 carries head 21 to a station 74 where a continuous ribbon or web 103 of laminate extends transversely to track 101. Ribbon 103 moves intermittently to provide a fresh portion above head 21 adjacent lip 27 of orifice 28. Both track 101 and ribbon 103 stop momentarily during which time a power driven die cutter 105, reciprocating vertically as shown at 106, and having a hollow circular die 107, cuts a circular seal 35 over dispensing orifice 28 on lips 27. The seal 35 is held in position over the orifice on the lips by a vacuum created in chamber 108 extending beneath track 101 by vacuum 110. This is shown in the block diagram of FIG. 1 at 76. The chamber vacuum is applied beneath head 21 through shoulder 22 to dispensing orifice 28 to hold seal 35 in place.

Die cutter 105 reciprocates upwardly, and both track 101 and ribbon 103 move. Track 101 carries head 21 to station 78, where a reciprocating hot press 112 having a heated platen 113 within a body 115 moves downwardly against the head 21. Heated platen 113, for instance at a temperature of 300° F., is held against seal 35 momentarily to fuse the laminate, of which seal 35 is formed, to the lips 27 of plastic head 21.

Hot press 112 then moves upwardly whereupon the weld between seal 35 and lips 27 cools, forming an adhesive bond.

The tab 135 of the invention is formed, along with seal 35, at station 76 and bent at station 78. Stations 76 and 78 are enclosed within the box 200 to indicate the places in the '818 method where the present invention occurs. The method and means of forming the tab 135 will be described in detail below.

Track 101 then continues its intermittent movement. The movements of track 101, web 103, die cutter 105, and press 112 are all coordinated.

The seal 35, now bonded to head 21, as indicated at 80, can now be inspected as indicated at station 82, in the block diagram of FIG. 1.

A tube wall 30 is formed at station 84, as in the prior art.

The head 21 with seal 35 bonded thereto, and tube wall 30 are then assembled on a mandrel at station 86 as indicated in FIG. 1. The assembly 118 travels to station 90 where the wall 30 is bonded at 23 to head 21 by radio frequency waves.

At station 90, a reciprocating radio frequency collar 120 having a weld ring 121 is brought into contact with assembly 118, wherein the tube wall 30 is welded at 23 to head 21 in a well known prior art manner. To protect seal 35 against damage from the heat generated by radio waves emitting from the weld ring, and impinging against seal 35 wherein there is a heat buildup, a heat sink is used. This is shown in detail in U.S. Pat. No. 4,938,818 referred to above and incorporated by reference.

The heat sink is applied to seal 35 as indicated at 88 in FIG. 2, during the bonding of the wall 23 to the head 21 as indicated at 90 in FIG. 1.

Heat sink reciprocates vertically as indicated at 123 wherein a contact head is brought against seal 35 when the radio frequency waves are being emitted. The head is connected by a gas filled tube to a heat exchange chamber. The gas within tube is one with a high heat conductivity. A liquid coolant, for instance water, is passed through the chamber to conduct heat from the gas tube.

The heat sink as described is a well known prior art device.

Radio frequency weld collar 120 and heat sink are interconnected so that they reciprocate in unison to perform the indicated operation.

Tube assemblies 118 are intermittently moved in a direction as indicated at 130, through station 90 to station 92 where cap 32 is applied. Mandrel 117, with completed tube assembly 118 thereon is rotated as at 131 to in effect thread the neck 25 onto the cap 32.

The completed tube 20, with cap secured thereon, is then ready for filling with the intended tube contents.

(c) The Present Improvement

A tab 135 is formed integral with seal 35 at station 76. Power driven die cutter 105 has a circular seal cutting portion 105a, and a radially extending tab cutting portion 105b. Tab cutting portion 105b also extends from the seal cutting portion 105a. Cutter 105 has a circular wall 140 reducing to a circular seal cutting wall 141, and extending to a tab cutting wall 142. Seal cutting wall 141 terminates at a beveled portion 143 to form a cutting edge 145. Tab cutting wall 142 terminates at a beveled portion 146 to form a cutting edge 147.

Figure 6:
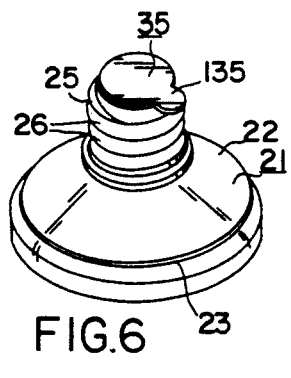
FIG. 6 is a perspective view of an injection molded head whose discharge orifice has been covered by a die cut seal with a tab.

At station 76, driven die cutter 105, with portion 105a and 105b cuts both a seal 35 and integral tab 135 as seen in FIGS. 6 and 4A. As described above, seal 35 is held in place by the vacuum 110 while the head 21 travels to the next station 78.

Figure 7:
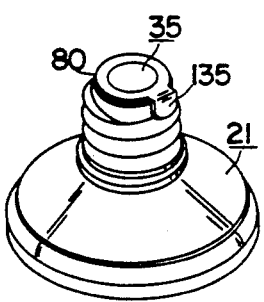
FIG. 7 is a perspective view of an injection molded head whose discharge orifice has been sealed by a seal with a tab, the tab being bent down adjacent the outer circumference of the neck.

At station 78, reciprocating the hot press 112 has a tab bending finger 150 which is fixed in, and extends below, the press head at 152 and reciprocates vertically therewith. When press 112 moves downwardly into position to weld seal 35 to neck 25, finger 150 bends radially extending tab 135 down along the neck 25 of the tube 20 to the position shown in FIG. 7. The tab bending finger contacts the radially extending tab before the press contacts the seal. The tab simply lies along the neck and is in no way bonded or welded or otherwise affixed to the neck 25 or thread 26.

The tube is subsequently completed in accordance with the teaching in the '818 patent. A cap is threaded onto the neck, again in accordance with the prior art. The tab 135 conforms to the thread 26 of neck 25 under the influence of the threads 32a of screw cap 32 as seen in FIG. 3.

In use, cap 32 is unscrewed from the neck of tube 20. Tab 135 is lifted from alongside the neck by, for instance, a fingernail, and then grasped by the finger and pulled. The tab 135 and seal 35 are of a laminate, as set forth above, which is strong and durable. A strong pull can be exerted on tab 135 without tearing the tab or seal, so that the weld or bond between the seal and neck can be broken and the seal simply peeled off the neck. The tube contents are now free to be discharged.

The screw cap can then be replaced in the usual way to preserve and contain the tube contents.

I claim:

1. The method of forming a tab on a seal of a laminate of plastic and metal across the dispensing orifice of a collabsible tube having
    (a) a separately made rigid plastic head portion with a neck and a dispensing opening therein, and
    (b) a separately made tube body of a laminate of plastic and metal foil, the head and tube body being welded together with radio frequency waves;

wherein the seal was formed by
    (1) applying the seal to the dispensing orifice of the head before the head is welded to the tube body by
        (a) moving a file of heads past a first station;
        (b) stopping each head intermittently at the first station;
        (c) continuously applying a vacuum to the head and dispensing orifice from below the head at the first station;
        (d) passing a web of laminate over the head adjacent the dispensing orifice at the first station;
        (e) cutting a seal from the web of laminate adjacent the dispensing orifice;
        (f) keeping the seal of laminate positioned on the head over the dispensing orifice by means of the vacuum;
        (g) applying a hot press to the seal, by reciprocating upward and downward motion, to fuse the seal to the head; and
        (h) terminating the vacuum below the head to the dispensing orifice, and
    (2) inserting a heat sink adjacent the seal during the welding by radio frequency waves of the head to the tube body, whereby any buildup of heat in the laminate seal is dissipated away from the seal to prevent damage to the seal;

the improvement comprising:
1. cutting a tab that is integral with and extends radially beyond the seal, when cutting the seal from the web of laminate adjacent the dispensing orifice, as set forth in step (e) above; and
2. bending said radially extending tab so that it extends substantially normal to the plane of the seal and along the neck of the head when applying the seal to the head, as set forth in step (g) above by;
    contacting said radially extending tab with a tab-bending finger,
    wherein said tab-bending finger is fixed in, and extends below, the hot press, and reciprocates vertically therewith, such that:
    on the downward motion of said hot press, said tab-bending finger contacts said radially extending tab before said hot press contacts the seal.

* * * * *